United States Patent
Xu et al.

(10) Patent No.: US 12,412,933 B2
(45) Date of Patent: Sep. 9, 2025

(54) ELECTRODE ASSEMBLY, BATTERY CELL, BATTERY, MANUFACTURING METHOD AND DEVICE FOR ELECTRODE ASSEMBLY

(71) Applicant: CONTEMPORARY AMPEREX TECHNOLOGY (HONG KONG) LIMITED, Hong Kong (CN)

(72) Inventors: Hu Xu, Ningde (CN); Miaomiao Ren, Ningde (CN); Xing Li, Ningde (CN); Haizu Jin, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 57 days.

(21) Appl. No.: 17/563,309

(22) Filed: Dec. 28, 2021

(65) Prior Publication Data
US 2022/0311056 A1   Sep. 29, 2022

Related U.S. Application Data

(63) Continuation of application No. PCT/CN2021/083434, filed on Mar. 26, 2021.

(51) Int. Cl.
*H01M 10/0587* (2010.01)
*H01M 4/02* (2006.01)
*H01M 10/42* (2006.01)

(52) U.S. Cl.
CPC ......... *H01M 10/0587* (2013.01); *H01M 4/02* (2013.01); *H01M 2004/021* (2013.01); *H01M 2010/4292* (2013.01); *H01M 2220/20* (2013.01)

(58) Field of Classification Search
CPC .. H01M 2010/4292; H01M 4/75; Y02E 60/10
See application file for complete search history.

(56) References Cited

U.S. PATENT DOCUMENTS 5,478,676 A * 12/1995 Turi .................. H01M 4/667
  429/234
5,744,258 A *  4/1998 Bai .................. H01M 4/366
  429/231.5

(Continued)

FOREIGN PATENT DOCUMENTS

CN   2758991 Y  *  2/2006
CN   105453315 A     3/2016

(Continued)

OTHER PUBLICATIONS

Nishida JP-2000090980 machine translation (Year: 2000).*

(Continued)

*Primary Examiner* — Ula C Ruddock
*Assistant Examiner* — Anna Korovina
(74) *Attorney, Agent, or Firm* — ANOVA LAW GROUP, PLLC

(57) ABSTRACT

An embodiment of the present application provides an electrode assembly, a battery cell, a battery, and a manufacturing method and device for the electrode assembly, which belong to the technical field of batteries. The electrode assembly includes a negative electrode plate and a positive electrode plate. The negative electrode plate includes a negative active material layer located in the straight area, and the positive electrode plate includes a positive active material layer located in the straight area. A first direction is perpendicular to an axial direction of a winding structure. The negative active material layer includes a negative electrode main body portion and negative electrode edge portions located on both sides of the negative electrode main body portion. The electrode assembly of this structure can effectively reduce the risk of lithium plating and improve the safety of the battery.

18 Claims, 7 Drawing Sheets

(56) References Cited

U.S. PATENT DOCUMENTS

| | | | | |
|---|---|---|---|---|
| 6,800,397 B2* | 10/2004 | Okada | ................ | H01M 10/052 |
| | | | | 429/231.95 |
| 10,056,617 B2 | 8/2018 | Hashimoto et al. | | |
| 2005/0130044 A1 | 6/2005 | Aoshima et al. | | |
| 2006/0068293 A1* | 3/2006 | Kim | ................ | H01M 10/0569 |
| | | | | 429/231.95 |
| 2010/0190049 A1* | 7/2010 | Kawase | ............. | H01M 50/209 |
| | | | | 429/159 |
| 2014/0201982 A1 | 7/2014 | Waseda | | |
| 2015/0221951 A1* | 8/2015 | Hashimoto | ............. | H01M 4/13 |
| | | | | 429/212 |
| 2016/0181619 A1 | 6/2016 | Hashimoto et al. | | |
| 2017/0012284 A1* | 1/2017 | Bugga | ................ | H01M 4/628 |
| 2018/0233738 A1* | 8/2018 | Jung | .................... | H01M 4/525 |
| 2020/0313166 A1 | 10/2020 | Kawai | | |
| 2020/0313171 A1 | 10/2020 | Wang et al. | | |
| 2020/0313176 A1* | 10/2020 | Wang | ................... | H01M 4/133 |
| 2021/0305633 A1 | 9/2021 | Xia et al. | | |
| 2021/0313567 A1 | 10/2021 | Sheng et al. | | |
| 2022/0006128 A1* | 1/2022 | Yoshioka | ............. | H01M 4/583 |

FOREIGN PATENT DOCUMENTS

| | | | | | |
|---|---|---|---|---|---|
| CN | 108258193 | A | | 7/2018 | |
| CN | 109841794 | A | * | 6/2019 | ........ H01M 10/0525 |
| CN | 110010902 | A | | 7/2019 | |
| CN | 111312987 | A | | 6/2020 | |
| CN | 111755257 | A | | 10/2020 | |
| CN | 111916844 | A | | 11/2020 | |
| CN | 112018329 | A | | 12/2020 | |
| CN | 212161994 | U | | 12/2020 | |
| JP | 03145070 | A | * | 6/1991 | |
| JP | 2000090980 | A | * | 3/2000 | |
| JP | 2007329077 | A | * | 12/2007 | |
| JP | 2011070976 | A | * | 4/2011 | |
| JP | 2013131471 | A | * | 7/2013 | |
| JP | 2014238990 | A | * | 12/2014 | |
| JP | 2015064975 | A | * | 4/2015 | |
| JP | 2016012541 | A | | 1/2016 | |
| JP | 2001015146 | | * | 1/2019 | |
| WO | 2017090219 | A1 | | 6/2017 | |

OTHER PUBLICATIONS

Inoue JP-2014238990 machine translation (Year: 2014).*
Okada JP-2007329077 machine translation (Year: 2007).*
Koga JP-2011070976 machine translation (Year: 2011).*
Masuda et al., JP-2015064975 Machine Translation (Year: 2015).*
Takahata et al., JP-2013131471 Machine Translation (Year: 2013).*
Oura et al., JP 2001-015146 Machine Translation (Year: 2001).*
Cao et al., "Understanding electrochemical potentials of cathode materials in rechargeable batteries", Materials Today, vol. 19, No. 2, Mar. 2016; http://dx.doi.org/10.1016/j.mattod.2015.10.009 (Year: 2016).*
Liu et al., CN 2758991 Machine Translation (Year: 2006).*
Yamamoto et al., JP 03145070 Machine Translation (Year: 1991).*
Extended European Search Report dated Aug. 12, 2022 received in European Patent Application No. EP 21809899.4.
Notification to Grant Patent Right for Invention dated Oct. 16, 2023 received in Chinese Patent Application No. CN 202180006850.0.

* cited by examiner

ELECTRODE ASSEMBLY, BATTERY CELL, BATTERY, MANUFACTURING METHOD AND DEVICE FOR ELECTRODE ASSEMBLY

CROSS-REFERENCE TO RELATED APPLICATIONS

This application is a continuation of International Application No. PCT/CN2021/083434, filed on Mar. 26, 2021, the disclosure of which is hereby incorporated by reference in its entirety.

TECHNICAL FIELD

The present application relates to the technical field of batteries, and in particular, to an electrode assembly, a battery cell, a battery, and a manufacturing method and device for the electrode assembly.

BACKGROUND

A rechargeable battery, which may be called as a secondary battery, refers to a battery that can be used continuously through the way of recharging by activating an active material after discharging. Rechargeable batteries are widely used in electronic devices, such as mobile phones, laptop computers, battery cars, electric cars, electric airplanes, electric ships, electric toy cars, electric toy ships, electric toy airplanes, electric tools, and so on.

In the development of battery technology, in addition to the issue of battery performance, the safety of the battery also needs to be considered. Therefore, how to improve the safety of the battery is an urgent problem to be solved in the battery technologies.

SUMMARY

Embodiments of the present application provide an electrode assembly, a battery cell, a battery, and a manufacturing method and device for the electrode assembly, which can effectively reduce lithium plating.

A first aspect of the embodiments of the present application provides an electrode assembly, including a negative electrode plate and a positive electrode plate, where the negative electrode plate and the positive electrode plate are laminated and wound to form a winding structure having a straight area, the negative electrode plate includes a negative active material layer located in the straight area, the positive electrode plate includes a positive active material layer located in the straight area and disposed opposite to the negative active material layer in a first direction, and the first direction is perpendicular to an axial direction of the winding structure; where the negative active material layer includes a negative electrode main body portion and negative electrode edge portions located on both sides of the negative electrode main body portion in the axial direction, in the first direction, at least a part of the negative electrode main body portion and at least a part of the negative electrode edge portion both overlap with the positive active material layer, an active substance capacity per unit area of the negative electrode main body portion is greater than an active substance capacity per unit area of the negative electrode edge portion; and/or, the positive active material layer includes a positive electrode main body portion and positive electrode edge portions located on both sides of the positive electrode main body portion in the axial direction, in the first direction, at least a part of the positive electrode main body portion and at least a part of the positive electrode edge portion both overlap with the negative active material layer, an active substance capacity per unit area of the positive electrode main body portion is less than an active substance capacity per unit area of the positive electrode edge portion.

In the above solution, the active substance capacity per unit area of the negative electrode main body portion is greater than the active substance capacity per unit area of the negative electrode edge portion, so that the negative electrode main body portion is less prone to lithium plating than the negative electrode edge portion. When the active substance capacity per unit area of the negative electrode edge portion meets configuration requirements, that is, the active substance capacity per unit area of the negative electrode edge portion reaches a first preset value, since the active substance capacity per unit area of the negative electrode main body portion is greater than the active substance capacity per unit area of the negative electrode edge portion, that is, the active substance capacity per unit area of the negative electrode main body portion is greater than the first preset value, which is equivalent to increasing the active substance capacity per unit area of the negative electrode main body portion and a CB value of the negative electrode main body portion, it is difficult to occur lithium plating in the negative electrode main body portion, thereby reducing the risk of lithium plating in the middle area of the negative active material layer in a first direction.

The active substance capacity per unit area of the positive electrode main body portion is less than the active substance capacity per unit area of the positive electrode edge portion, so that a part that the negative active material layer overlaps the positive electrode main body portion is less prone to lithium plating than a part that the negative active material layer overlaps the negative electrode edge portion. When the active substance capacity per unit area of the positive electrode edge portion meets the configuration requirements, that is, the active substance capacity per unit area of the positive electrode edge portion reaches a second preset value, since the active substance capacity per unit area of the positive electrode main body portion is less than the active substance capacity per unit area of the positive electrode edge portion, that is, the active substance capacity per unit area of the positive electrode main body portion is less than the second preset value, which is equivalent to reducing the active substance capacity per unit area of the positive electrode main body portion and a CB value of the part that the negative active material layer overlaps the positive electrode main body portion, it is difficult to occur lithium plating in the part that the negative active material layer overlaps the positive electrode main body portion, thereby reducing the risk of lithium plating in the middle area of the negative active material layer in the first direction.

In some embodiments, the negative active material layer includes the negative electrode main body portion and the negative electrode edge portion, and the positive active material layer includes the positive electrode main body portion and the positive electrode edge portion; and in the first direction, the at least a part of the negative electrode main body portion overlaps the at least part of the positive electrode main body portion, and the at least a part of the negative electrode edge portion overlaps the at least part of the positive electrode edge portion.

In the above solution, since the active substance capacity per unit area of the negative electrode main body portion is greater than the active substance capacity per unit area of the negative electrode edge portion, the active substance capacity per unit area of the positive electrode main body portion is less than the active substance capacity per unit area of the positive electrode edge portion, in the first direction, the at least a part of the negative electrode main body portion overlaps the at least part of the positive electrode main body portion, and the negative electrode main body portion is less prone to lithium plating, which further reduces the risk of lithium plating in the middle area of the negative active material layer in the first direction.

In some embodiments, in the first direction, the negative electrode main body portion completely overlaps the positive electrode main body portion.

In the above solution, in the first direction, the negative electrode main body portion completely overlaps the positive electrode main body portion, which may further reduce the risk of lithium plating in the negative electrode main body portion.

In some embodiments, the gram capacity of an active material of the negative electrode main body portion is greater than the gram capacity of an active material of the negative electrode edge portion.

In the above solution, the gram capacity of the active material of the negative electrode main body portion is greater than the gram capacity of the active material of the negative electrode edge portion, that is, by increasing the gram capacity of the active material of the negative electrode main body portion, the active substance capacity per unit area of the negative electrode main body portion can be increased, so as to realize that the active substance capacity per unit area of the negative electrode main body portion is greater than the active substance capacity per unit area of the negative electrode edge portion.

In some embodiments, a ratio of the weight of the active material of the negative electrode main body portion to the weight of the negative electrode main body portion is greater than a ratio of the weight of the active material of the negative electrode edge portion to the weight of the negative electrode edge portion.

In the above solution, the ratio of the weight of the active material of the negative electrode main body portion to the weight of the negative electrode main body portion is greater than the ratio of the weight of the active material of the negative electrode edge portion to the weight of the negative electrode edge portion, that is, by increasing a proportion of the active material of the negative electrode main body portion, the active substance capacity per unit area of the negative electrode main body portion can be increased, so as to realize that the active substance capacity per unit area of the negative electrode main body portion is greater than the active substance capacity per unit area of the negative electrode edge portion.

In some embodiments, the gram capacity of an active material of the positive electrode main body portion is greater than the gram capacity of an active material of the positive electrode edge portion.

In the above solution, the gram capacity of the active material of the positive electrode main body portion is smaller than the gram capacity of the active material of the positive electrode edge portion, that is, by reducing the gram capacity of the active material of the positive electrode main body portion, the active substance capacity per unit area of the positive electrode main body portion can be reduced, so as to realize that the active substance capacity per unit area of the positive electrode main body portion is less than the active substance capacity per unit area of the positive electrode edge portion.

In some embodiments, the positive electrode main body portion includes a first positive electrode coating layer and a second positive electrode coating layer laminated and arranged in the first direction; and the gram capacity of an active material of the first positive electrode coating layer is less or equal to the gram capacity of the active material of the positive electrode edge portion, and the gram capacity of an active material of the second positive electrode coating layer is less than the gram capacity of the active material of the first positive electrode coating layer.

In the above solution, the positive electrode main body portion includes a first positive electrode coating layer and a second positive electrode coating layer laminated and arranged in the first direction. Since the gram capacity of the active material of the first positive electrode coating layer is less than or equal to the gram capacity of the active material of the positive electrode edge portion, and the gram capacity of the active material of the second positive electrode coating layer is less than the gram capacity of the active material of the first positive electrode coating layer, so that the gram capacity of the active material of the positive electrode main body portion is less than the gram capacity of the active material of the positive electrode edge portion, thereby making the active substance capacity per unit area of the positive electrode main body portion less than the active substance capacity per unit area of the positive electrode edge portion.

In some embodiments, a ratio of the weight of the active material of the positive electrode main body portion to the weight of the positive electrode main body portion is less than a ratio of the weight of the active material of the positive electrode edge portion to the weight of the positive electrode edge portion.

In the above solution, the ratio of the weight of the active material of the positive electrode main body portion to the weight of the positive electrode main body portion is greater than the ratio of the weight of the active material of the positive electrode edge portion to the weight of the positive electrode edge portion, that is, by reducing a proportion of the active material of the positive electrode main body portion, the active substance capacity per unit area of the positive electrode main body portion can be reduced, so as to realize that the active substance capacity per unit area of the positive electrode main body portion is less than the active substance capacity per unit area of the positive electrode edge portion.

In some embodiments, a thickness of the positive electrode main body portion is less than a thickness of the positive electrode edge portion.

In the above technical solution, by reducing the thickness of the positive electrode main body portion to make the thickness of the positive electrode main body portion less than the thickness of the positive electrode edge portion, so that the active substance capacity per unit area of the positive electrode main body portion less than the active substance capacity per unit area of the positive electrode edge portion can also be realized. In addition, since the thickness of the positive electrode main body portion is less than the thickness of the positive electrode edge portion, the thickness of the positive electrode plate in the area where the positive electrode main body portion is located is relatively thin, which increases an expansion resistance threshold of this area to reduce the possibility of lithium plating.

In some embodiments, the negative electrode main body portion and the negative electrode edge portion are continuously distributed in the axial direction.

In the above solution, the negative electrode main body portion and the negative electrode edge portion are continuously distributed in the axial direction, that is, the negative active material layer of the negative electrode plate is uninterrupted in the axial direction, which is beneficial to increase the capacity of the battery cell.

In some embodiments, the positive electrode main body portion and the positive electrode edge portion are continuously distributed in the axial direction.

In the above solution, the positive electrode main body portion and the positive electrode edge portion are continuously distributed in the axial direction, that is, the positive active material layer of the positive electrode plate is uninterrupted in the axial direction, which is beneficial to increase the capacity of the battery cell.

A second aspect of the embodiments of the present application provides a battery cell, including a shell and the electrode assembly according to any one of the embodiments of the above first aspect; and the electrode assembly being accommodated in the shell.

A third aspect of the embodiments of the present application provides a battery, including a box body, and the battery cell according to any one of the embodiments of the above second aspect; and the battery cell being accommodated in the box body.

A fourth aspect of the embodiments of the present application provides a power consumption device, including the battery according to any one of the embodiments of the above third aspect.

A fifth aspect of the embodiments of the present application provides a manufacturing method for an electrode assembly, including: providing a negative electrode plate and a positive electrode plate; laminating and winding the negative electrode plate and the positive electrode plate to form a winding structure; where the winding structure has a straight area, the negative electrode plate includes a negative active material layer located in the straight area, the positive electrode plate includes a positive active material layer located in the straight area and disposed opposite to the negative active material layer in a first direction, and the first direction is perpendicular to an axial direction of the winding structure; where the negative active material layer includes a negative electrode main body portion and negative electrode edge portions located on both sides of the negative electrode main body portion in the axial direction, in the first direction, at least a part of the negative electrode main body portion and at least a part of the negative electrode edge portion both overlap with the positive active material layer, an active substance capacity per unit area of the negative electrode main body portion is greater than an active substance capacity per unit area of the negative electrode edge portion; and/or, the positive active material layer includes a positive electrode main body portion and positive electrode edge portions located on both sides of the positive electrode main body portion in the axial direction, in the first direction, at least a part of the positive electrode main body portion and at least a part of the positive electrode edge portion both overlap with the negative active material layer, an active substance capacity per unit area of the positive electrode main body portion is greater than an active substance capacity per unit area of the positive electrode edge portion.

A sixth aspect of the embodiments of the present application provides a manufacturing device for an electrode assembly, including a providing apparatus, configured to provide a positive electrode plate and a negative electrode plate; an assembling apparatus, configured to laminate and wind the negative electrode plate and the positive electrode plate to form a winding structure; where the winding structure has a straight area, the negative electrode plate includes a negative active material layer located in the straight area, the positive electrode plate includes a positive active material layer located in the straight area and disposed opposite to the negative active material layer in a first direction, and the first direction is perpendicular to an axial direction of the winding structure; where the negative active material layer includes a negative electrode main body portion and negative electrode edge portions located on both sides of the negative electrode main body portion in the axial direction, in the first direction, at least a part of the negative electrode main body portion and at least a part of the negative electrode edge portion both overlap with the positive active material layer, an active substance capacity per unit area of the negative electrode main body portion is greater than an active substance capacity per unit area of the negative electrode edge portion; and/or, the positive active material layer includes a positive electrode main body portion and positive electrode edge portions located on both sides of the positive electrode main body portion in the axial direction, in the first direction, at least a part of the positive electrode main body portion and at least a part of the positive electrode edge portion both overlap with the negative active material layer, an active substance capacity per unit area of the positive electrode main body portion is less than an active substance capacity per unit area of the positive electrode edge portion.

BRIEF DESCRIPTION OF DRAWINGS

To describe the technical solutions in the embodiments of the present application more clearly, the following briefly describes the accompanying drawings required for the embodiments. Apparently, the accompanying drawings in the following description show merely some embodiments of the present application, and persons of ordinary skill in the art may still derive other drawings from these accompanying drawings without creative efforts.

FIG. 7 is an A-A cross-sectional view of the electrode assembly shown in

FIG. 5;

Figure 1:
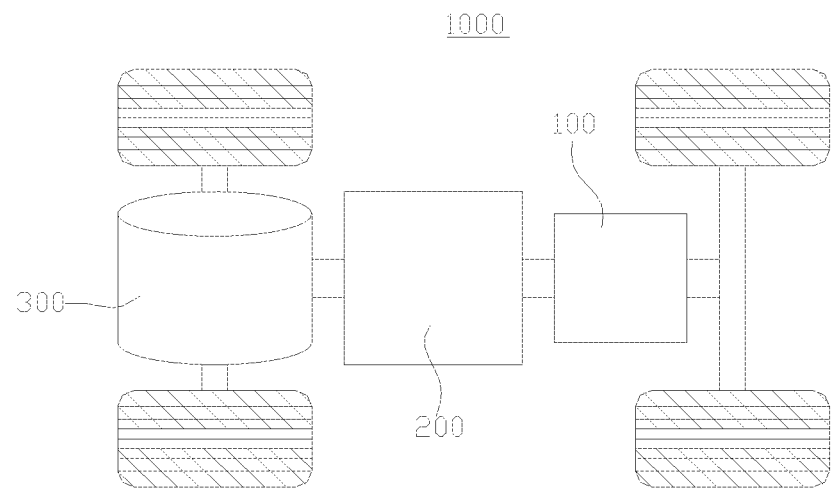
FIG. 1 is a schematic structural diagram of a vehicle provided by some embodiments of the present application.

In the drawings, the drawings are not drawn to actual scale.

Description of signs: 10—box body; 11—first portion; 12—second portion; 13—accommodating space; 20—battery cell; 21—shell; 211—housing; 212—cover body; 213—sealed space; 22—electrode assembly; 221—negative electrode plate; 2211—negative electrode current collector; 2212—negative active material body; 2213—negative active material layer; 2213a—negative electrode main body portion; 2213b—negative electrode edge portion; 222—positive electrode plate; 2221—positive electrode current collector; 2222—positive active material body; 2223—positive active material layer; 2223a—positive electrode main body portion; 2223b—positive electrode edge portion; 2223c—first positive electrode coating layer; 2223d—second electrode positive coating layer; 223—separator; 224—straight area; 225—bending area; 23—positive electrode terminal; 24—negative electrode terminal; 25—pressure relief mechanism; 30—battery module; 31—busbar component; 100—battery; 200—controller; 300—motor; 1000—vehicle; 2000—manufacturing device; 2100—providing apparatus; 2200—assembling apparatus; Z—axial direction; and X—first direction.

DESCRIPTION OF EMBODIMENTS

To make the objectives, technical solutions and advantages of the embodiments of the present application clearer, the following clearly describes the technical solutions in the embodiments of the present application with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "including" and "having" and any variations thereof in the specification and the claims of the present application as well as the foregoing description of the accompanying drawings are intended to cover non-exclusive inclusions. The terms "first", "second" and the like in the specification and the claims of the present application as well as the above drawings are used to distinguish different objects, rather than to describe a specific order or primary-secondary relationship.

The phrase "embodiments" referred to in the present application means that the descriptions of specific features, structures, and characteristics in combination with the embodiments are included in at least an embodiment of the present application. The phrase at various locations in the specification does not necessarily refer to the same embodiment, or an independent or alternative embodiment exclusive of another embodiment.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection;

may be a direct connection and may also be an indirect connection via an intermediate medium, or may be communication between the interiors of two elements. Those of ordinary skill in the art may appreciate the specific meanings of the foregoing terms in the present application according to specific circumstances.

In the present application, the term "and/or" is only an association relation describing associated objects, which means that there may be three relations. For example, A and/or B may represent three situations: A exists alone, both A and B exist, and B exists alone. In addition, the character "/" in the present application generally indicates that the associated objects before and after the character are in an "or" relation.

In the embodiments of the present application, same components are denoted by same reference numerals, and detailed description of the same components is omitted in different embodiments for brevity. It should be understood that dimensions such as thicknesses, lengths and widths of various components in embodiments of the present application shown in the drawings, as well as dimensions of the overall thickness, length and width of an integrated apparatus are merely illustrative, and should not constitute any limitation to the present application.

In the present application, "a plurality of" means two or more (including two).

In the present application, battery cells may include lithium-ion secondary batteries, lithium-ion primary batteries, lithium-sulfur batteries, sodium/lithium-ion batteries, sodium-ion batteries or magnesium-ion batteries, and the like, which are not limited by the embodiments of the present application. The battery cells may be cylindrical, flat, cuboid or in another shape, which is not limited by the embodiments of the present application. The battery cell is generally divided into three types according to the way of packaging: a cylindrical battery cell, a prismatic battery cell and a pouch battery cell, which are not limited by the embodiments of the present application.

The battery mentioned in the embodiments of the present application refers to a single physical module that includes one or more battery cells to provide a higher voltage and capacity. For example, the battery mentioned in the present application may include a battery module or a battery pack. The battery generally includes a box body for enclosing one or more battery cells. The box body may prevent liquid or other foreign matters from affecting the charging or discharging of the battery cells.

The battery cell includes an electrode assembly and an electrolytic solution, and the electrode assembly is composed of a positive electrode plate, a negative electrode plate and a separator. The operation of the battery cell mainly relies on the movement of metal ions between the positive electrode plate and the negative electrode plate. The positive electrode plate includes a positive electrode current collector and a positive active material body. The positive active material body is coated on a surface of the positive electrode current collector, and the positive electrode current collector that is not coated with the positive active material body protrudes from the positive electrode current collector coated with the positive active material body, and the positive electrode current collector that is not coated with the positive active material body is used as a positive electrode tab. As an example, in a lithium-ion battery, the material of the positive electrode current collector may be aluminum, and the positive electrode active material may be lithium cobalt oxides, lithium iron phosphate, ternary lithium or lithium manganate, and the like. The negative electrode plate includes a negative electrode current collector and a negative active material body. The negative active material body is coated on a surface of the negative electrode current collector, and the negative electrode current collector that is not coated with the negative active material body protrudes from the negative electrode current collector coated with the negative active material body, and the negative electrode current collector that is not coated with the negative active material body is used as a negative electrode tab. The material of the negative electrode current collector may be copper, and the negative active material may be carbon or silicon, and the like. In order to ensure that no fusing occurs when a large current passes through, there are a plurality of positive electrode tabs which are laminated together, and there are a plurality of negative electrode tabs which are laminated together. A material of the separator may be polypropylene (PP) or polyethylene (PE), or the like. In addition, the electrode assembly may be a coiled structure or a laminated structure, and the embodiments of the present application are not limited thereto.

With the development of the battery technology, it is necessary to consider many design factors, such as energy density, cycle life, discharge capacity, charge-discharge rate and other performance parameters. In addition, the safety of the battery should also be considered.

For lithium-ion batteries, during charging, lithium ions are deintercalating from the positive electrode and intercalated into the negative electrode; during discharging, lithium ions are deintercalating from the negative electrode and intercalated into the positive electrode. When a lithium-ions battery is charging, abnormalities may occur that may result in lithium plating. For example, the phenomenon of lithium plating is caused by abnormalities such as insufficient space for lithium to be intercalated into the negative electrode, excessive resistance to lithium ion migration, or lithium ions detaching from the positive electrode too quickly but not being able to be intercalated into the negative electrode in equal quantities, which means that lithium ions that cannot be intercalated into the negative electrode can only gain electrons on the surface of the negative electrode, resulting in the formation of elementary substance lithium.

The inventor found that, in a battery cell, the electrode assembly has a large expansion force in the middle area of the electrode plate in a straight area, making electrolyte infiltration difficult and thus causing the negative electrode plate in the area to be prone to phenomenon of lithium plating.

In view of this, the embodiments of the preset application provide an electrode assembly, including a negative electrode plate and a positive electrode plate, where the negative electrode plate and the positive electrode plate are laminated and wound to form a winding structure having a straight area, the negative electrode plate includes a negative active material layer located in the straight area, the positive electrode plate includes a positive active material layer located in the straight area and disposed opposite to the negative active material layer in a first direction, and the first direction is perpendicular to an axial direction of the winding structure; where the negative active material layer includes a negative electrode main body portion and negative electrode edge portions located on both sides of the negative electrode main body portion in the axial direction, in the first direction, at least a part of the negative electrode main body portion and at least a part of the negative electrode edge portion both overlap with the positive active material layer, an active substance capacity per unit area of the negative electrode main body portion is greater than an active substance capacity per unit area of the negative electrode edge portion; and/or, the positive active material layer includes a positive electrode main body portion and positive electrode edge portions located on both sides of the positive electrode main body portion in the axial direction, in the first direction, at least a part of the positive electrode main body portion and at least a part of the positive electrode edge portion both overlap with the negative active material layer, an active substance capacity per unit area of the positive electrode main body portion is less than an active substance capacity per unit area of the positive electrode edge portion. The electrode assembly of this structure can effectively reduce the risk of lithium plating and improve the safety of the battery.

The technical solution described in embodiments of the present application is applicable to a battery and a power consumption device using the battery.

The power consumption device may be vehicles, mobile phones, portable devices, notebook computers, ships, spacecraft, electric toys, electric tools, and the like. The vehicle can be fuel vehicles, gas vehicles or new energy vehicles; new energy vehicles can be pure electric vehicles, hybrid vehicles or extended range vehicles, and the like; the spacecrafts include airplanes, rockets, space shuttles and spaceships, or the like; the electric toys include fixed or mobile electric toys, such as game consoles, electric vehicle toys, electric ship toys and electric airplane toys, or the like; the electric tools include metal cutting power tools, grinding power tools, assembly power tools and railway power tools, such as electric drills, electric grinders, electric wrenches, electric screwdrivers, electric hammers, impact drills, concrete vibrators, and electric planers, and the like. The embodiment of the present application does not impose special restrictions on the above power consumption devices.

For the convenience of description, the following embodiments take a vehicle as an example of the power consumption device for description.

Please refer to FIG. 1. FIG. 1 is a schematic structural diagram of a vehicle 1000 provided by some embodiments of the present application. A battery 100 is provided inside the vehicle 1000, and the battery 100 may be provided at the bottom, head, or tail of the vehicle 1000. The battery 100 may be used for power supply of the vehicle 1000, for example, the battery 100 may be used as an operating power source of the vehicle 1000.

The vehicle 1000 further includes a controller 200 and a motor 300. The controller 200 is configured to control the battery 100 to supply power to the motor 300, for example, for starting, navigating, and working power requirements during driving of the vehicle 1000.

In some embodiments, the battery 100 may serve not only as an operation power source of the vehicle 1000, but also as a driving power source of the vehicle 1000, replacing or partially replacing fuel or natural gas to provide driving power for the vehicle 1000.

Figure 2:
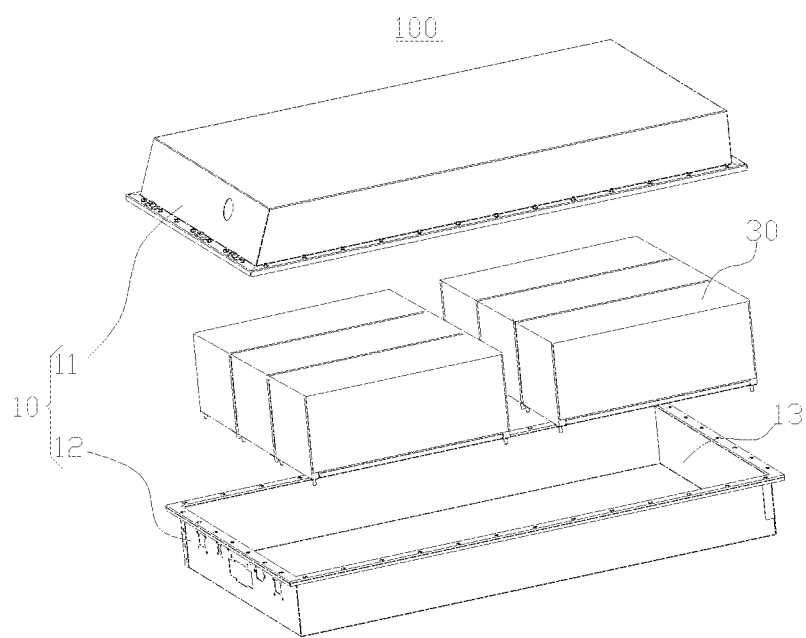
FIG. 2 is an exploded view of a battery provided by some embodiments of the present application.

Please refer to FIG. 2. FIG. 2 is an exploded view of the battery 100 provided by some embodiments of the present application. The battery 100 includes a box body 10 and a battery cell 20 (not shown in FIG. 2), and the battery cell 20 is accommodated in the box body 10.

The box body 10 is configured to accommodate the battery cell 20, and the box body 10 may have various structures. In some embodiments, the box body 10 may include a first portion 11 and a second portion 12, the first portion 11 and the second portion 12 are mutually covered, and the first portion 11 and the second portion 12 jointly define an accommodating space 13 for accommodating the battery cell 20. The second portion 12 may be a hollow structure with one end open, the first portion 11 is a plate-shaped structure, the first portion 11 covers an opening side of the second portion 12, to form the box body 10 with the accommodating space 13. The first portion 11 and the second portion 12 may also be hollow structures with one side open, and the opening side of the first portion 11 covers the opening side of the second portion 12 to form the box body 10 with the accommodating space 13. Of course, the first portion 11 and the second portion 12 may have various shapes, such as a cylinder, a cuboid, and the like.

In the battery 100, there may be one or more battery cells 20. If there are a plurality of battery cells 20, the plurality of battery cells 20 can be connected in series or in parallel or in parallel-series. The parallel-series connection refers to that the plurality of battery cells 20 are connected both in series and in parallel. The plurality of battery cells 20 can be directly connected in series or in parallel or in parallel-series, and then an entirety formed by the plurality of battery cells 20 can be accommodated in the box body 10. Of course, the plurality of battery cells 20 may also be connected in series first, or in parallel or in parallel-series to form a battery module; then a plurality of battery modules are connected in series or in parallel or in parallel-series to form as an entirety, and accommodated in the box body 10.

Figure 3:
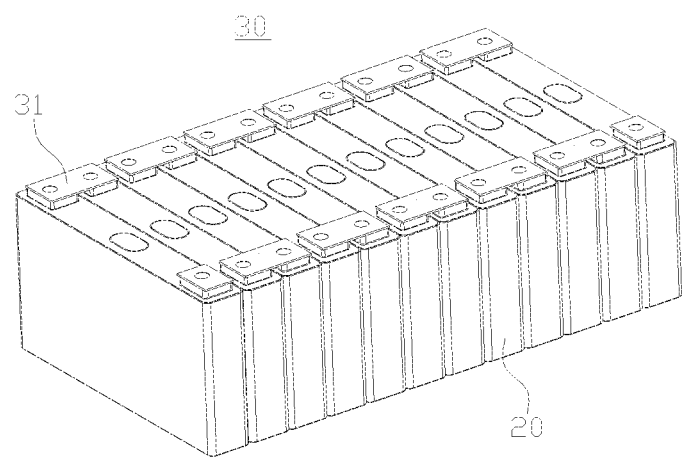
FIG. 3 is a schematic structural diagram of a battery module provided by some embodiments of the present application.

In some embodiments, please refer to FIG. 3, FIG. 3 is schematic structural diagram of a battery module 30 provided by some embodiments of the present application. The plurality of battery cells 20 are connected in series, or in parallel, or in parallel-series first to form the battery module 30. The plurality of battery modules 30 are then connected in series or in parallel or in parallel-series to form as the entirety, and accommodated in the box body 10.

The plurality of battery cells 20 in the battery module 30 may be electrically connected through a busbar component 31, so as to realize the connection of the plurality of battery cells 20 in the battery module 30 in parallel, or in series or in parallel-series. Exemplarily, the busbar component 31 is a metal conductor.

Figure 4:
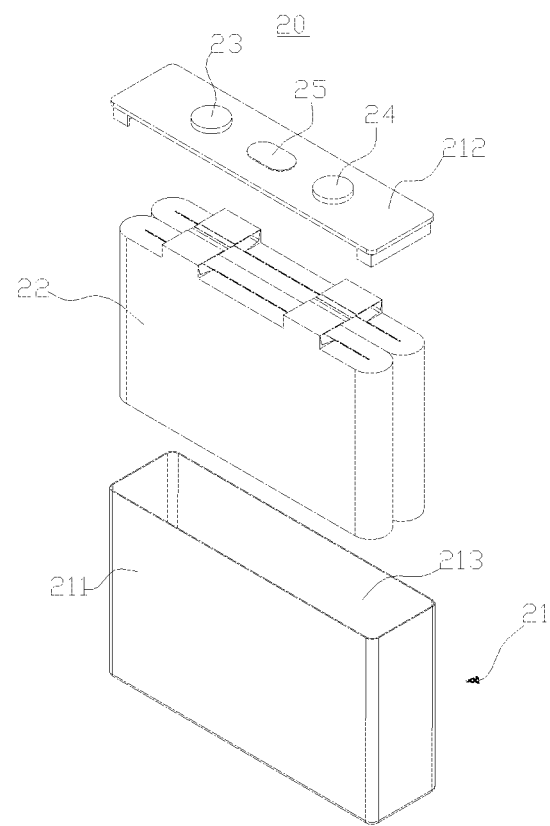
FIG. 4 is an exploded view of a battery cell provided by some embodiments of the present application.

Please refer to FIG. 4, FIG. 4 is an exploded view of the battery cell 20 according to some embodiments of the present application. The battery cell 20 provided by the embodiment of the present application includes a shell 21 and an electrode assembly 22, and the electrode assembly 22 is accommodated in the shell 21.

In some embodiments, the shell 21 may also be used to contain electrolytes, such as electrolyte solutions.

In some embodiments, the shell 21 may include a housing 211 and a cover body 212. The housing 211 is a hollow structure with one side open. The cover body 212 covers an opening of the housing 211 and forms a sealed connection to form a sealed space 213 for accommodating the electrode assembly 22 and the electrolyte.

When assembling the battery cell 20, the electrode assembly 22 may be put into the housing 211 first, and the housing 211 is filled with the electrolyte, and then the cover body 212 covers the opening of the housing 211.

The housing 211 may have various shapes, such as a cylinder, a cuboid, or the like. The shape of the housing 211 may be determined according to a specific shape of the electrode assembly 22. For example, if the electrode assembly 22 has a cylindrical structure, a cylindrical housing may be selected; if the electrode assembly 22 has a cuboid structure, a cuboid flat housing may be selected. Of course, the cover body 212 may also have various structures, for example, the cover body 212 has a plate-shaped structure, a hollow structure with one end open, or the like. Exemplarily, in FIG. 4, the housing 211 has a cuboid structure, the cover body 212 has a plate-shaped structure, and the cover body 212 covers the opening at the top of the housing 211.

In some embodiments, the battery cell 20 may further include a positive electrode terminal 23, a negative electrode terminal 24 and a pressure relief mechanism 25. The positive electrode terminal 23, the negative electrode terminal 24 and the pressure relief mechanism 25 are all mounted on the cover body 212. The positive electrode terminal 23 and the negative electrode terminal 24 are both used to electrically connect to the electrode assembly 22 to output the electric energy generated by the electrode assembly 22. The pressure relief mechanism 25 is used to relieve the pressure inside of the battery cell 20 when the internal pressure or temperature of the battery cell 20 reaches a predetermined threshold.

Exemplarily, the pressure relief mechanism 25 may be a component such as an explosion-proof valve, a rupture plate, a gas valve, a pressure relief valve, or a safety valve, and the like.

It should be noted that, in the battery cell 20, there may be one or more electrode assemblies 22 accommodated in the shell 21. Exemplarily, in FIG. 4, there are two electrode assemblies 22.

Next, the specific structure of the electrode assembly 22 will be described in detail with reference to the drawings.

Figure 5:
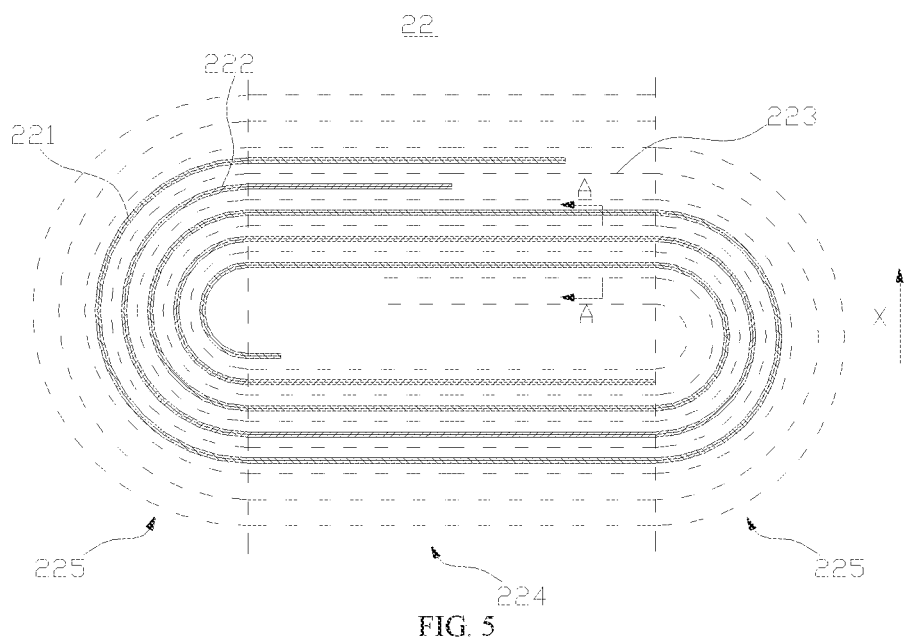
FIG. 5 is a schematic structural diagram of an electrode assembly provided by some embodiments of the present application.

Please refer to FIG. 5, FIG. 5 is a schematic structural diagram of the electrode assembly 22 provided by some embodiments of the present application. The electrode assembly 22 includes a negative electrode plate 221 and a positive electrode plate 222, and the negative electrode plate 221 and the positive electrode plate 222 are laminated and wound to form a winding structure.

Exemplarily, the electrode assembly 22 has a flat winding structure.

It should be noted that the winding structure has an axial direction Z (not shown in FIG. 5), and the axial direction Z of the winding structure is the arrangement direction of the winding axis of the winding structure, which can also be understood as a width direction of the positive electrode plate 222 and the negative electrode plate 221. When the negative electrode plate 221 and the positive electrode plate 222 are wound after being laminated by a winding member (located at a winding core position of the winding structure), an extension direction of the winding member is the arrangement direction of the winding axis of the winding structure.

In some embodiments, the electrode assembly 22 may further include a separator 223 for isolating the positive electrode plate 222 from the negative electrode plate 221 to reduce the risk of a short circuit between the positive electrode plate 222 and the negative electrode plate 221.

Where, the separator 223 is provided with a large number of penetrating apertures to ensure the free passage of electrolyte ions. Exemplarily, a material of the separator 223 may be polypropylene (PP) or polyethylene (PE), and the like.

In the actual manufacturing process, the negative electrode plate 221, the separator 223, and the positive electrode plate 222 may be laminated together, and then wound integrally to form a winding structure.

In some embodiments, the winding structure has a straight area 224. The straight area is the area where the winding structure has a straight structure, that is, the negative electrode plate 221, the positive electrode plate 222, and the separator 223 in the straight area 224 are basically straight and parallel to each other. It is understandable that, in the straight area 224, a surface of each layer of the negative electrode plate 221, a surface of each layer of the positive electrode plate 222, and a surface of each layer of the separator 223 are all plane surfaces.

The negative electrode plate 221 in the straight area 224 and the positive electrode plate 222 in the straight area 224 are alternately superimposed in a first direction X, that is, in the straight area 224, in the first direction X, they are arranged in a way that a layer of the negative electrode plate 221, a layer of the positive electrode plate 222, and a layer of the negative electrode plate 221 are arranged in sequence.

In some embodiments, the winding structure may further include a bending area 225, the bending area 225 is connected to the straight area 224, and the bending areas 225 may be provided to the opposite two ends of the straight area 224. The bending area 225 is the area in the winding structure having a bending structure, that is, the negative electrode plate 221, the positive electrode plate 222, and the separator 223 in the bending area 225 are all bent. It is understandable that, in the bending area 225, a surface of each layer of the negative electrode plate 221, a surface of each layer of the positive electrode plate 222, and a surface of each layer of the separator 223 are all curved surfaces. Exemplarily, the curved surface is an arc surface.

Figure 6:
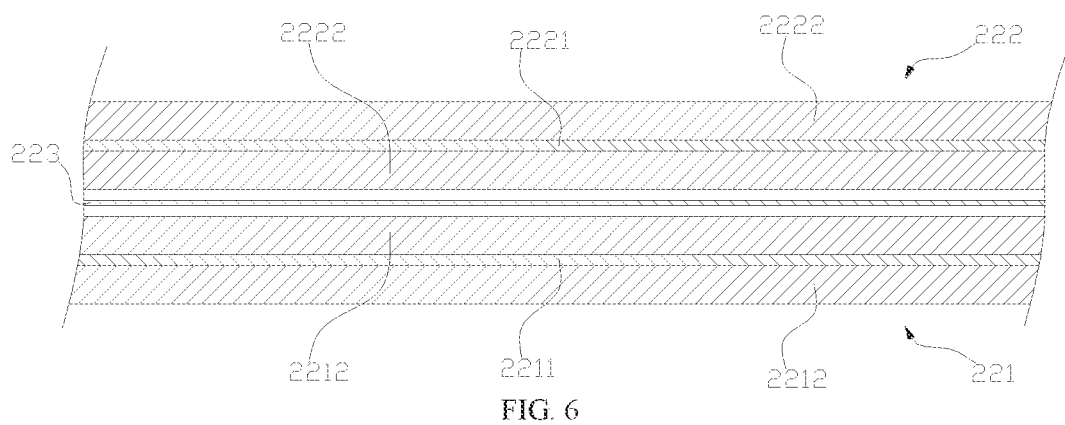
FIG. 6 is a partial view of a positive electrode plate, a separator, and a negative electrode plate after being expanded shown in FIG. 5.

In some embodiments, please refer to FIG. 6, FIG. 6 is a partial view of the positive electrode plate 222, the separator 223, and the negative electrode plate 221 after being expanded shown in FIG. 5. The negative electrode plate 221 includes a negative electrode current collector 2211 and negative active material bodies 2212 coated on both sides of the negative electrode current collector 2211 in the thickness direction. The positive electrode plate 222 includes a positive electrode current collector 2221 and positive active material bodies 2222 coated on both sides of the positive electrode current collector 2221 in the thickness direction.

Figure 7:
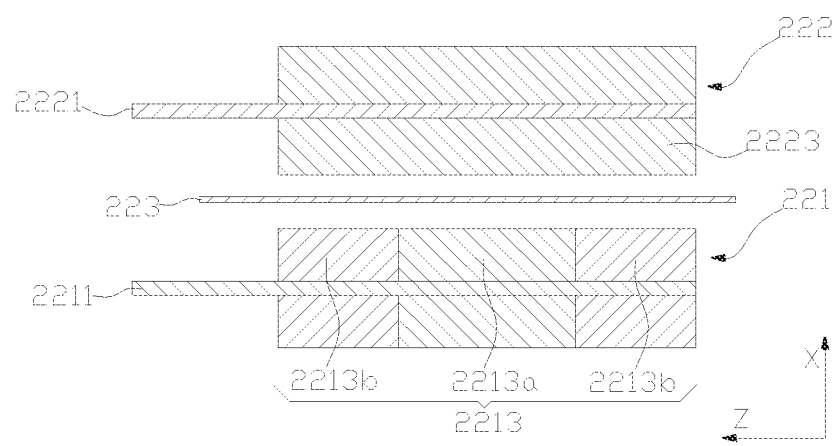

In some embodiments, please refer to FIG. 7, FIG. 7 is an A-A cross-sectional view of the electrode assembly 22 shown in FIG. 5. The negative electrode plate 221 includes a negative active material layer 2213 located in the straight area 224 (refer to FIG. 5), the positive electrode plate 222 includes a positive active material layer 2223 located in the straight area 224 and disposed opposite to the negative active material layer 2213 in a first direction X, and the first direction X is perpendicular to the axial direction Z of the winding structure. The first direction X referred to herein is consistent with the thickness direction of the negative active material layer 2213.

The negative active material layer 2213 includes a negative electrode main body portion 2213a and negative electrode edge portions 2213b located on both sides of the negative electrode main body portion 2213a in the axial direction Z, in the first direction X, at least a part of the negative electrode main body portion 2213a and at least a part of the negative electrode edge portion 2213b both overlap with the positive active material layer 2233, an active substance capacity per unit area of the negative electrode main body portion 2213a is greater than an active substance capacity per unit area of the negative electrode edge portion 2213b.

Since the active substance capacity per unit area of the negative electrode main body portion 2213a is greater than the active substance capacity per unit area of the negative electrode edge portion 2213b, so that the negative electrode main body portion 2213a is less prone to lithium plating than the negative electrode edge portion 2213b. When the active substance capacity per unit area of the negative electrode edge portion 2213b meets the configuration requirements, that is, the active substance capacity per unit area of the negative electrode edge portion 2213b reaches a first preset value, since the active substance capacity per unit area of the negative electrode main body portion 2213a is greater than the active substance capacity per unit area of the negative electrode edge portion 2213b, that is, the active substance capacity per unit area of the negative electrode main body portion 2213a is greater than the first preset value, which is equivalent to increasing the active substance capacity per unit area of the negative electrode main body portion 2213a, increasing a CB (Cell Balance) value of the negative electrode main body portion 2213a, and increasing an expansion resistance threshold of the area where the negative electrode main body portion 2213a in the negative electrode plate 221 is located, it is difficult to occur lithium plating in the negative electrode main body portion 2213a, thereby reducing the risk of lithium plating in the middle area of the negative active material layer 2213 in the first direction X.

It should be noted that the negative active material layer 2213 is the part of the negative electrode active material body 2212 of the negative electrode plate 221 in the straight area 224. The structure of the part of the negative active material body 2212 in the straight area 224 and the structure of the part of the negative active material body 2212 in the bending area 225 may be the same, or different. The positive active material layer 2223 is the part of the positive active material body 2222 of the positive electrode plate 222 in the straight area 224. The structure of the part of the positive active material body 2222 in the straight area 224 and the structure of the part of the positive active material body 2222 in the bending area 225 may be the same, or different.

In the embodiment of the present application, the CB (Cell Balance) value of the negative electrode main body portion 2213a is Q1/Q2, where Q1 is an active substance capacity per unit area of the negative electrode main body portion 2213a, and Q2 is an active substance capacity per unit area of a part that the positive active material layer 2223 overlaps the negative electrode main body portion 2213a in the first direction X.

In some embodiments, the negative electrode main body portion 2213a and the negative electrode edge portion 22133b are continuously distributed in the axial direction Z, that is, the negative active material layer 2213 of the negative electrode plate 221 is uninterrupted in the axial direction Z, which is beneficial to increase the capacity of the battery cell 20. Of course, in other embodiments, the negative electrode main body portion 2213a and the negative electrode edge portion 2213b may also be spaced apart in the axial direction Z.

In the embodiment of the present application, there are many ways to realize that the active substance capacity per unit of the negative electrode main body portion 2213a is greater than the active substance capacity per unit area of the negative electrode edge portion 2213b.

In some embodiments, the gram capacity of an active material of the negative electrode main body portion 2213a is greater than the gram capacity of an active material of the negative electrode edge portion 2213b. That is, by increasing the gram capacity of the active material of the negative electrode main body portion 2213a, the active substance capacity per unit area of the negative electrode main body portion 2213a can be increased, so as to realize that the active substance capacity per unit area of the negative electrode main body portion 2213a is greater than the active substance capacity per unit area of the negative electrode edge portion 2213b.

The gram capacity refers to a ratio of the capacitance released by the active material to the mass of the active material.

In the present embodiment, the thickness of the negative electrode main body portion 2213a may be equal to the thickness of the negative electrode edge portion 2213b. An active material of the negative electrode main body portion 2213a may be different from an active material of the negative electrode edge portion 2213b. For example, the active material of the negative electrode main body portion 2213a is silicon, and the active material of the negative electrode edge portion 2213b is graphite.

Of course, there may be other ways to realize that the active substance capacity per unit area of the negative electrode main body portion 2213a is greater than the active substance capacity per unit area of the negative electrode edge portion 2213b.

In some embodiments, a ratio of the weight of the active material of the negative electrode main body portion 2213a to the weight of the negative electrode main body portion 2213a is greater than a ratio of the weight of the active material of the negative electrode edge portion 2213b to the weight of the negative electrode edge portion 2213b. That is, by increasing the proportion of the active material of the negative electrode main body portion 2213a, the active substance capacity per unit area of the negative electrode main body portion 2213a can be increased, so as to realize that the active substance capacity per unit area of the negative electrode main body portion 2213a is greater than the active substance capacity per unit area of the negative electrode edge portion 2213b.

Exemplarily, the compositions of the negative electrode main body portion 2213a and the negative electrode edge portion 2213b may both include an active material, a conductive agent, and a binder, and the active material of the negative electrode main body portion 2213a and the active material of the negative electrode edge portion 2213b may be the same.

In the embodiment of the present application, as the active substance capacity per unit of the negative electrode main body portion 2213a is greater than the active substance capacity per unit area of the negative electrode edge portion 2213b, the positive active material layer 2223 may have various structures.

In some embodiments, the positive active material layer 2223 includes a positive electrode main body portion 2223a and positive electrode edge portions 2223b located on both sides of the positive electrode main body portion 2223a in the axial direction Z, in the first direction X, at least a part of the positive electrode main body portion 2223a and at least a part of the positive electrode edge portion 2223b both overlap with the negative active material layer 2213, an active substance capacity per unit area of the positive electrode main body portion 2223a is equal to an active substance capacity per unit area of the positive electrode edge portion 2223b.

Figure 8:
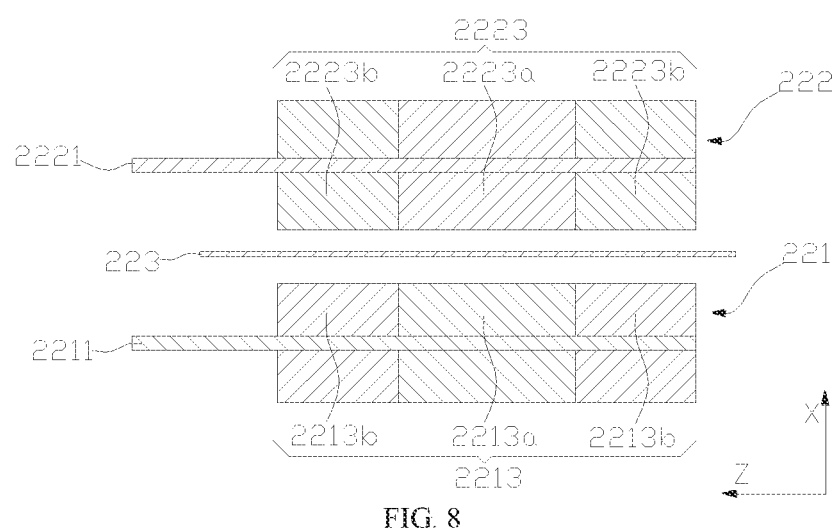
FIG. 8 is a partial cross-sectional view of an electrode assembly provided by some embodiments of the present application.

In other embodiments, please refer to FIG. 8, FIG. 8 is a partial cross-sectional view of the electrode assembly 22 provided by some embodiments of the application. The positive active material layer 2223 includes the positive electrode main body portion 2223a and the positive electrode edge portions 2223b located on both sides of the positive electrode main body portion 2223a in the axis direction Z, in the first direction X, at least a part of the positive electrode main body portion 2223a and a least a part of the positive electrode edge portion 2223b both overlap with the negative active material layer 2213, and an active substance capacity per unit area of the positive electrode main body portion 2223a is less than an active substance capacity per unit area of the positive electrode edge portion 2223b.

The active substance capacity per unit area of the positive electrode main body portion 2223a is less than the active substance capacity per unit area of the positive electrode edge portion 2223b, so that a part that the negative active material layer 2213 overlaps the positive electrode main body portion 2223a is less prone to lithium plating than a part that the negative active material layer 2213 overlaps the negative electrode edge portion 2213b. When the active substance capacity per unit area of the positive electrode edge portion 2223b meets the configuration requirements, that is, the active substance capacity per unit area of the positive electrode edge portion 2223b reaches a second preset value, since the active substance capacity per unit area of the positive electrode main body portion 2223a is less than the active substance capacity per unit area of the positive electrode edge portion 2223b, that is, the active substance capacity per unit area of the positive electrode main body portion 2223a is less than the second second value, which is equivalent to reducing the active substance capacity per unit area of the positive electrode main body portion 2223a and a CB value of the part that the negative active material layer 2213 overlaps the positive electrode main body portion 2223a, it is difficult to occur lithium plating in the part that the negative active material layer 2213 overlaps the positive electrode main body portion 2223a, thereby reducing the risk of lithium plating in the middle area of the negative active material layer 2213 in the first direction X.

In some embodiments, the positive electrode main body portion 2223a and the positive electrode edge portion 2223b are continuously distributed in the axial direction Z, that is, the positive active material layer 2223 of the positive electrode plate 222 is uninterrupted in the axial direction Z, which is beneficial to increase the capacity of the battery cell 20. Of course, in other embodiments, the positive electrode main body portion 2223a and the positive electrode edge portion 2223b may also be spaced apart in the axial direction Z.

In some embodiments, in the first direction X, the at least a part of the negative electrode main body portion 2213a overlaps the at least part of the positive electrode main body portion 2223a, and the at least a part of the negative electrode edge portion 2213b overlaps the at least part of the positive electrode edge portion 2223b.

Since the active substance capacity per unit area of the negative electrode main body portion 2213a is greater than the active substance capacity per unit area of the negative electrode edge portion 2213b, the active substance capacity per unit area of the positive electrode main body portion 2223a is less than the active substance capacity per unit area of the positive electrode edge portion 2223b in the first direction X, the at least a part of the negative electrode main body portion 2213a overlaps the at least part of the positive electrode main body portion 2223a, and the negative electrode main body portion 2213a is less prone to lithium plating, which further reduces the risk of lithium plating in the middle area of the negative active material layer 2213 in the first direction X.

It should be noted that, in the first direction X, the at least part of the negative electrode main body portion 2213a overlaps with the at least part of the positive electrode main body portion 2223a, that is, a projection of the negative electrode main body portion 2213a in the first direction X at least partially overlaps and a projection of the positive electrode main body portion 2223a in the first direction X. In the first direction X, the at least part of the negative electrode edge portion 2213b overlaps with the at least part of the positive electrode edge portion 2223b, that is, a projection of the negative electrode edge portion 2213b in the first direction X at least partially overlaps a projection of the positive electrode edge portion 2223b in the first direction X.

In some embodiments, in the first direction X, the negative electrode main body portion 2213a completely overlaps the positive electrode main body portion 2223a, so as to further reduce the risk of lithium plating in the negative electrode main body portion 2213a. Of course, in the first direction X, the negative electrode edge portion 2213b may also completely overlap the positive electrode edge portion 2223b.

In the embodiment of the present application, there are many ways to further realize that the active substance capacity per unit area of the positive electrode main body portion 2223a is less than the active substance capacity per unit area of the positive electrode edge portion 2223b.

In some embodiments, please continue to refer to FIG. 8, the gram capacity of the active material of the positive electrode main body portion 2223a is less than the gram capacity of the active material of the positive electrode edge portion 2223b. That is, by reducing the gram capacity of the active material of the positive electrode main body portion 2223a, the active substance capacity per unit area of the positive electrode main body portion 2223a can be reduced, so as to realize that the active substance capacity per unit area of the positive electrode main body portion 2223a is less than the active substance capacity per unit area of the positive electrode edge portion 2223b.

In the present embodiment, a thickness of the positive electrode main body portion 2223a may be equal to a thickness of the positive electrode edge portion 2223b, and the active material of the positive electrode main body portion 2223a may be different from the active material of the positive electrode edge portion 2223b. For example, the active material of the positive electrode main body portion 2223a is lithium iron phosphate, and the active material of the positive electrode edge portion 2223b is ternary lithium.

Figure 9:
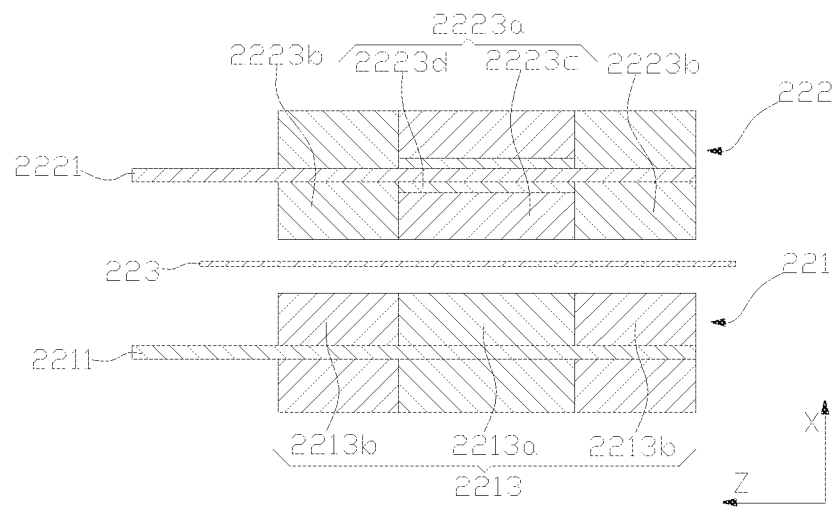
FIG. 9 is a partial cross-sectional view of an electrode assembly provided by yet other embodiments of the present application.

In some embodiments, please refer to FIG. 9, FIG. 9 is a partial cross-sectional view of the electrode assembly 22 provided by yet other embodiments of the present application. The positive electrode main body portion 2223a includes a first positive electrode coating 2223c and a second positive electrode coating 2223d. The gram capacity of an active material of the first positive electrode coating layer 2223c is less than or equal to the gram capacity of the active material of the positive electrode edge portion 2223b, and the gram capacity of an active material of the second positive electrode coating layer 2223d is less than the gram capacity of the active material of the first positive electrode coating layer 2223c, so that the gram capacity of the active material of the positive electrode main body portion 2223a is less than the gram capacity of the active material of the positive electrode edge portion 2223b, thereby making the active substance capacity per unit area of the positive electrode main body portion 2223a less than the active substance capacity per unit area of the positive electrode edge portion 2223b.

Where, the first positive electrode coating layer 2223c may be an active material layer containing active materials, or an inactive material layer containing non-active materials. For example, the first positive electrode coating layer 2223c is a metal conductive layer, which only plays a role of conducting electricity.

Exemplarily, as shown in FIG. 9, the total thickness of the first positive electrode coating layer 2223c and the second positive electrode coating layer 2223d may be equal to the thickness of the positive electrode edge portion 2223b. The gram capacity of the active material of the first positive electrode coating layer 2223c may be equal to the gram capacity of the active material of the positive electrode edge portion 2223b, the active material of the first positive electrode coating layer 2223c may be the same as the active material of the positive electrode edge portion 2223b, and the active material of the first positive electrode coating layer 2223c may be different from the active material of the second positive electrode coating layer 2223d.

It should be note that the first positive electrode coating layer 2223c and the second positive electrode coating layer 2223d are laminated and arranged in the first direction X. The first positive electrode coating layer 2223c may be coated on the positive electrode current collecting body 2221, and the second positive electrode coating layer 2223d may be coated on one side of the first positive electrode coating layer 2223c facing away from the positive electrode current collecting body 2221. The second positive electrode coating layer 2223d may be coated on the positive electrode current collecting body 2221, and the first positive electrode coating layer 2223c may be coated on one side of the second positive electrode coating layer 2223d facing away from the positive electrode current collecting body 2221.

Of course, there are other ways to realize that the active substance capacity per unit area of the positive electrode main body portion 2223a is less than the active substance capacity per unit area of the positive electrode edge portion 2223b.

In some embodiments, a ratio of the weight of the active material of the positive electrode main body portion 2223a to the weight of the positive electrode main body portion 2223a is less than a ratio of the weight of the active material of the positive electrode edge portion 2223b to the weight of the positive electrode edge portion 2223b. That is, by reducing a proportion of the active material of the positive electrode main body portion 2223a, the active substance capacity per unit area of the positive electrode main body portion 2223a can be reduced, so as to realize that the active substance capacity per unit area of the positive electrode main body portion 2223a is less than the active substance capacity per unit area of the positive electrode edge portion 2223b.

Exemplarily, the compositions of the positive electrode main body portion 2223a and the positive electrode edge portion 2223b may both include an active material, a conductive agent, and a binder, and the active material of the positive electrode main body portion 2223a and the active material of the positive electrode edge 2223b may be the same.

Figure 10:
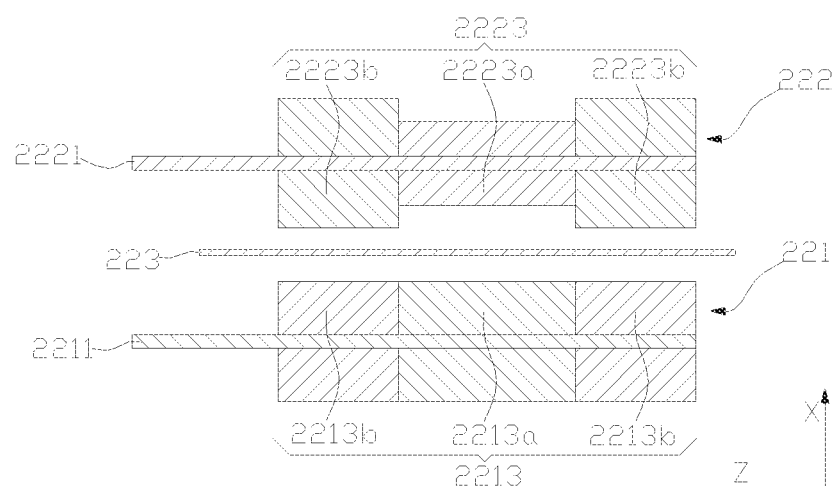
FIG. 10 is a partial cross-sectional view of an electrode assembly provided by still other embodiments of the present application.

In other embodiments, please refer to FIG. 10, FIG. 10 is a partial cross-sectional view of the electrode assembly 22 provided by still other embodiments of the present application. The thickness of the positive electrode main body portion 2223a is less than the thickness of the positive electrode edge 2223b.

By reducing the thickness of the positive electrode main body portion 2223a to make the thickness of the positive electrode main body portion 2223a less than the thickness of the positive electrode edge portion 2223b can also realize that the active substance capacity per unit area of the positive electrode main body portion 2223a is less than the active substance capacity per unit area of the positive electrode edge portion 2223b. In addition, since the thickness of the positive electrode main body portion 2223a is less than the thickness of the positive electrode edge portion 2223b, the thickness of the positive electrode plate 222 in the area where the positive electrode main body portion 2223q is located is relatively thin, which increases an expansion resistance threshold of this area to reduce the occurrence of lithium plating.

In the present embodiment, the material of the positive electrode main body portion 2223a is the same as the material of the positive electrode edge portion 2223b. It can be understood that the composition of the positive electrode main body portion 2223a is the same as the composition of the positive electrode edge portion 2223b, and the proportion of each component in the positive electrode main body portion 2223a is the same as the proportion of each component in the positive electrode edge portion 2223b. For example, the compositions of the positive electrode main body portion 2223a and the positive electrode edge portion 2223b both include an active material, a conductive agent, and a binder, the active material, where the conductive agent and the binder of the positive electrode main body portion 2223a are the same as the active material, the conductive agent and the binder of the positive electrode edge portion 2223b, the proportion of the active material in the positive electrode main body portion 2223a is the same as the proportion of the active material of the positive electrode edge portion 2223b, the proportion of the conductive agent in the positive electrode main body portion 2223a is the same as the proportion of the conductive agent of the positive electrode edge portion 2223b, and the proportion of the binder in the positive electrode main body portion 2223a is the same as the proportion of the binder of the positive electrode edge portion 2223b.

It should be noted that, in the embodiment of the present application, in the positive active material layer 2223, as the active substance capacity per unit area of the positive electrode main body portion 2223a is less than the active substance capacity per unit area of the positive electrode edge portion 2223b, in the negative active material layer 2213, the active substance capacity per unit area of the negative electrode main body portion 2213a may be equal to the active substance capacity per unit area of the negative electrode edge portion 2213b.

Figure 11:
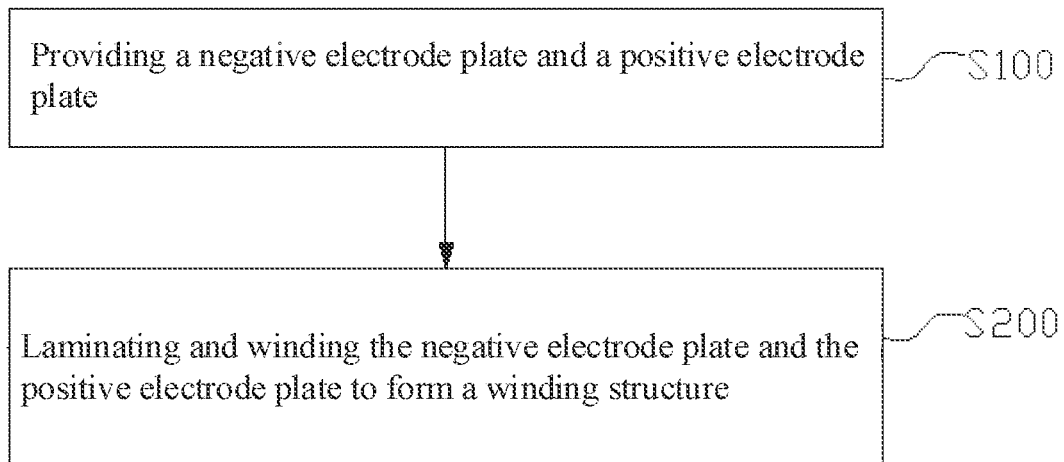
FIG. 11 is a flowchart of a manufacturing method for an electrode assembly provided by some embodiments of the present application.

Please refer to FIG. 11. FIG. 11 is a flowchart of a manufacturing method for the electrode assembly 22 provided by some embodiments of the present application. The manufacturing method of the electrode assembly 22 includes:

S100: providing a negative electrode plate 221 and a positive electrode plate 222;

S200: laminating and winding the negative electrode plate 211 and the positive electrode plate 222 to form a winding structure;

where the winding structure has a straight area 224, the negative electrode plate 221 includes a negative active material layer 2213 located in the straight area 224, the positive electrode plate 222 includes a positive active material layer 2223 located in the straight area 224 and disposed opposite to the negative active material layer 2213 in a first direction X, and the first direction X is perpendicular to an axial direction Z of the winding structure.

The negative active material layer 2213 includes a negative electrode main body portion 2213a and negative electrode edge portions 2213b located on both sides of the negative electrode main body portion 2213a in the axial direction Z, in the first direction X, at least a part of the negative electrode main body portion 2213a and at least a part of the negative electrode edge portion 2213b both overlap with the positive active material layer 2223, an active substance capacity per unit area of the negative electrode main body portion 2213a is greater than an active substance capacity per unit area of the negative electrode edge portion 2213b; and/or, the positive active material layer 2223 includes a positive electrode main body portion 2223a and positive electrode edge portions 2223b located on both sides of the positive electrode main body portion 2223a in the axial direction Z, in the first direction X, at least a part of the positive electrode main body portion 2223a and at least a part of the positive electrode edge portion 2223b both overlap with the negative active material layer 2213, an active substance capacity per unit area of the positive electrode main body portion 2223a is less than an active substance capacity per unit area of the positive electrode edge portion 2223b.

Figure 12:
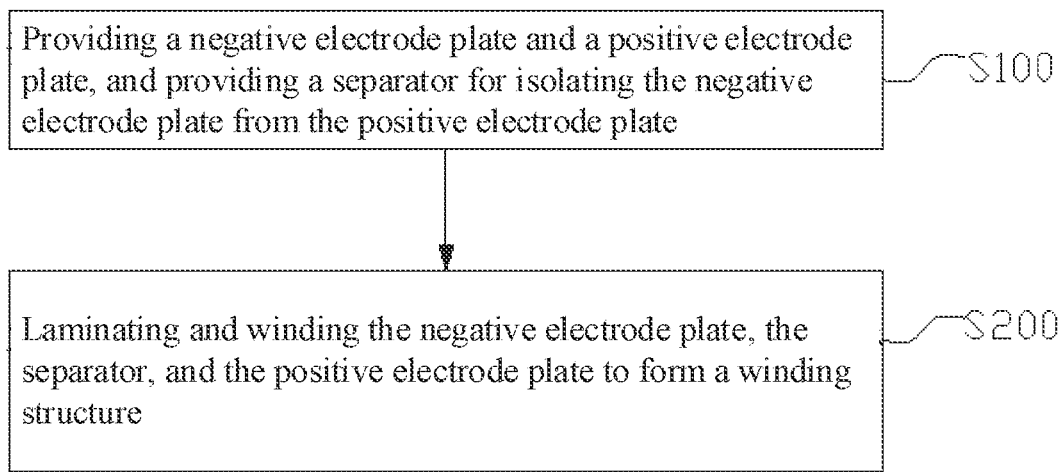
FIG. 12 is a flowchart of a manufacturing method for an electrode assembly provided by yet other embodiments of the present application.

In some embodiments, please refer to FIG. 12, FIG. 12 is a flowchart of a manufacturing method for the electrode assembly 22 provided by yet other embodiments of the present application. A separator 223 is further provided to isolate the positive electrode plate 222 from the negative electrode plate 221, and the negative electrode plate 221 and the separator 223 and the positive electrode plate 222 are laminated and wound to form a winding structure.

It should be noted that for the related structure of the electrode assembly 22 manufactured by the above embodiment providing the manufacturing method for the electrode assembly 22 may refer to the electrode assembly 22 provided in the above respective embodiments.

Figure 13:
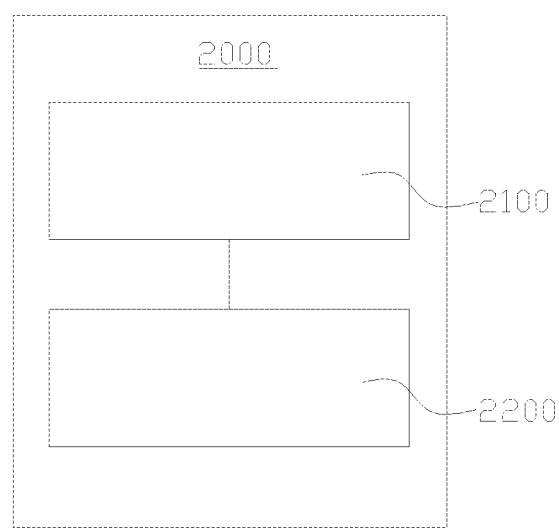
FIG. 13 is a schematic block diagram of a manufacturing device for an electrode assembly provided by some embodiments of the present application.

Please refer to FIG. 13. FIG. 13 is a schematic block diagram of a manufacturing device 2000 of the electrode assembly 22 provided by some embodiments of the present application. The manufacturing device 2000 includes a providing apparatus 2100 and an assembling apparatus 2200. The providing apparatus 2100 is configured to provide a positive electrode plate 222 and a negative electrode plate 221. The assembling apparatus 2200 is configured to laminate and wind the negative electrode plate 221 and the positive electrode plate 222 to form a winding structure.

Where, the winding structure has a straight area 224, the negative electrode plate 221 includes a negative active material layer 2213 located in the straight area 224, the positive electrode plate 222 includes a positive active material layer 2223 located in the straight area 224 and disposed opposite to the negative active material layer 2213 in a first direction X, and the first direction X is perpendicular to an axial direction Z of the winding structure.

The negative active material layer 2213 includes a negative electrode main body portion 2213a and negative electrode edge portions 2213b located on both sides of the negative electrode main body portion 2213a in the axial direction Z, in the first direction X, at least a part of the negative electrode main body portion 2213a and at least a part of the negative electrode edge portion 2213b both overlap with the positive active material layer 2223, an active substance capacity per unit area of the negative electrode main body portion 2213a is greater than an active substance capacity per unit area of the negative electrode edge portion 2213b; and/or, the positive active material layer 2223 includes a positive electrode main body portion 2223a and positive electrode edge portions 2223b located on both sides of the positive electrode main body portion 2223a in the axial direction Z, in the first direction X, at least a part of the positive electrode main body portion 2223a and at least a part of the positive electrode edge portion 2223b both overlap with the negative active material layer 2213, an active substance capacity per unit area of the positive electrode main body portion 2223a is less than an active substance capacity per unit area of the positive electrode edge portion 2223b.

In some embodiments, the providing apparatus 2100 is further configured to provide a separator 223, configured to isolate the positive electrode plate 222 from the negative electrode plate 221, and the negative electrode plate 221, the separator 223, and the positive electrode plate 222 are laminated and wound to form a winding structure.

It should be noted that for the related structure of the electrode assembly 22 manufactured by the above manufacturing device 2000 for the electrode assembly 22 provided by the above embodiment, please refer to the electrode assembly 22 provided in the above respective embodiments.

In addition, the embodiment of the present application further provides a method for testing the CB value of the electrode assembly 22, and steps for testing the CB value are as follows:

Step 1): Test an average discharge capacity of a single-sided positive active material layer. Take the positive electrode plate in above embodiments, and use a punching mold to obtain small wafers containing the single-sided positive active material layer. Assemble six identical CR2430 button cells in an argon protected glove box using lithium metal plates as counter electrodes, a Celgard membrane as a separator and a solution of EC+DMC+DEC (vinyl carbonate, dimethyl carbonate, diethyl carbonate in a 1:1:1 volume ratio) dissolved in LiPF6 (1 mol/L) as electrolyte. ① leave the battery to stand for 12 hours after the assembly, ② perform constant current charging at a charging current of 0.1 C until the voltage reaches the upper cut-off voltage x1V, then maintain the voltage x1V for constant voltage charging until the current is 50 uA, ③ stand for 5 minutes, ④ finally perform constant current discharge at a discharging current of 0.1 C until the voltage reaches the lower cut-off voltage y1V, ⑤ stand for 5 minutes, repeat steps ② to ⑤ and record the discharge capacity of the 2nd cycle. The average of the discharge capacities of the six button cells is the average discharge capacity of the single-sided positive active material layer. For example, when the positive active material is lithium iron phosphate (LFP), the upper cut-off voltage x1V=3.75V and the lower cut-off voltage y1V=2V. When the negative active material is lithium nickel cobalt manganese oxide (NCM), the upper cut-off voltage x1V=4.25V and the lower cut-off voltage y1V=2.8V.

Step 2): Test an average charge capacity of the single-sided negative active material layer. Take the negative electrode plate in above embodiments and use the punching mold to obtain small wafers containing the single-sided negative active material layer with a same area as the positive electrode wafers in the above step 1). Assemble six CR2430 button cells in an argon protected glove box using lithium metal plates as counter electrodes, a Celgard membrane as a separator and a solution of EC+DMC+DEC (vinyl carbonate, dimethyl carbonate, diethyl carbonate in a 1:1:1 volume ratio) dissolved in LiPF6 (1 mol/L) as electrolyte. ① leave the battery to stand for 12 hours after the assembly, ② constant current discharge at a discharging current of 0.05 C until the voltage reaches the lower cut-off voltage y2 mV, ③ then constant current discharge at a discharging current of 50 uA until the voltage reaches the lower cut-off voltage y2 mV, ④ stand for 5 minutes, ⑤ then constant current discharge at a discharging current of 10 uA until the lower cut-off voltage y2 mV is reached, ⑥ stand for 5 minutes, ⑦ finally constant current charge at 0.1 C charging current for constant current charging until the final voltage reaches the upper cut-off voltage x2 V, ⑧ stand for 5 minutes, repeat steps ② to ⑧ and record the charging capacity for the second cycle. The average of the charge capacities of the six button cells is the average charge capacity of the single-sided negative active material layer. For example, when the negative active material is graphite, the upper cut-off voltage x2V=2V and the lower cut-off voltage y2V=5 mV. When the negative active material is silicon, the upper cut-off voltage x2V=2V and the lower cut-off voltage y2V=5 mV.

Step 3): Calculation of the CB value based on the CB value=average charge capacity (mAh) of the above single-sided negative active material layer/average discharge capacity (mAh) of the above single-sided positive active material layer.

It should be noted that, the embodiments in the present application and features in the embodiments may be mutually combined provided that no conflict is caused.

The above embodiments are merely used to illustrate the technical solution of the present application, but are not intended to limit the present application. For those skilled in the art, the present application may have various amendments and modifications. Any modification, equivalent replacement, or improvement made without departing from the spirit and principle of the present application shall fall within the protection scope of the present application.

What is claimed is:

1. An electrode assembly, comprising a negative electrode plate and a positive electrode plate, wherein:
    the negative electrode plate and the positive electrode plate are laminated and wound to form a winding structure having a straight area, the negative electrode plate comprises a negative active material layer located in the straight area, the positive electrode plate comprises a positive active material layer located in the straight area and disposed opposite to the negative active material layer in a first direction, and the first direction is perpendicular to an axial direction of the winding structure;
    the negative active material layer comprises a negative electrode main body portion and a negative electrode edge portion on both sides of the negative electrode main body portion in the axial direction, in the first direction, at least a part of the negative electrode main body portion and at least a part of the negative electrode edge portion on both sides of the negative electrode main body portion overlap with the positive active material layer, an active substance capacity per unit area of the negative electrode main body portion is greater than an active substance capacity per unit area of the negative electrode edge portion; and the positive active material layer comprises a positive electrode main body portion and a positive electrode edge portion on both sides of the positive electrode main body portion in the axial direction, in the first direction, at least a part of the positive electrode main body portion and at least a part of the positive electrode edge portion on both sides of the positive electrode main body portion overlap with the negative active material layer, an active substance capacity per unit area of the positive electrode main body portion is less than an active substance capacity per unit area of the positive electrode edge portion;

in the first direction, two ends of the negative electrode main body portion in the axial direction are aligned with two ends of the positive electrode main body portion in the axial direction, respectively;

the positive electrode plate further comprises a positive electrode current collecting body, and the positive electrode main body portion comprises a first positive electrode coating layer and a second positive electrode coating layer arranged at a same side of the positive electrode current collecting body, and the first positive electrode coating layer and the second positive electrode coating layer being laminated and arranged in the first direction, and comprising different materials or having different compositions;

the first positive electrode coating layer is a metal conductive layer without active material; and the second positive electrode coating layer is coated on the positive electrode current collecting body, and the first positive electrode coating layer is coated on one side of the second positive electrode coating layer facing away from the positive electrode current collecting body.

2. The electrode assembly according to claim 1, wherein a gram capacity of an active material of the negative electrode main body portion is greater than a gram capacity of an active material of the negative electrode edge portion, wherein:

the gram capacity of the active material of the negative electrode main body portion is a ratio of a capacitance released by the active material of the negative electrode main body portion to a mass of the active material of the negative electrode main body portion, and the gram capacity of the active material of the negative electrode edge portion is a ratio of a capacitance released by the active material of the negative electrode edge portion to a mass of the active material of the negative electrode edge portion.

3. The electrode assembly according to claim 1, wherein a ratio of a weight of the active material of the negative electrode main body portion to a weight of the negative electrode main body portion is greater than a ratio of a weight of the active material of the negative electrode edge portion to a weight of the negative electrode edge portion.

4. The electrode assembly according to claim 1, wherein a gram capacity of an active material of the positive electrode main body portion is less than a gram capacity of an active material of the positive electrode edge portion, wherein:

the gram capacity of the active material of the positive electrode main body portion is a ratio of a capacitance released by the active material of the positive electrode main body portion to a mass of the active material of the positive electrode main body portion, and the gram capacity of the active material of the positive electrode edge portion is a ratio of a capacitance released by the active material of the positive electrode edge portion to a mass of the active material of the positive electrode edge portion.

5. The electrode assembly according to claim 4, wherein a gram capacity of an active material of the first positive electrode coating layer is less or equal to a gram capacity of an active material of the positive electrode edge portion, and a gram capacity of an active material of the second positive electrode coating layer is less than the gram capacity of the active material of the first positive electrode coating layer, wherein:

the gram capacity of the active material of the positive electrode edge portion is a ratio of a capacitance released by the active material of the positive electrode edge portion to a mass of the active material of the positive electrode edge portion, the gram capacity of the active material of the first positive electrode coating layer is a ratio of a capacitance released by the active material of the first positive electrode coating layer to a mass of the active material of the first positive electrode coating layer, and the gram capacity of the active material of the second positive electrode coating layer is a ratio of a capacitance released by the active material of the second positive electrode coating layer to a mass of the active material of the second positive electrode coating layer.

6. The electrode assembly according to claim 1, wherein a ratio of a weight of the active material of the positive electrode main body portion to a weight of the positive electrode main body portion is less than a ratio of a weight of the active material of the positive electrode edge portion to a weight of the positive electrode edge portion.

7. The electrode assembly according to claim 1, wherein a thickness of the positive electrode main body portion is less than a thickness of the positive electrode edge portion.

8. The electrode assembly according to claim 1, wherein the negative electrode main body portion and the negative electrode edge portion are continuously distributed in the axial direction.

9. The electrode assembly according to claim 1, wherein the positive electrode main body portion and the positive electrode edge portion are continuously distributed in the axial direction.

10. A battery cell, comprising a shell and the electrode assembly according to claim 1; and the electrode assembly being accommodated in the shell.

11. A battery, comprising a box body and the battery cell according to claim 10; and the battery cell electrode assembly being accommodated in the box body.

12. A power consumption device, comprising the battery according to claim 11.

13. A manufacturing method for the electrode assembly according to claim 1, comprising:

providing the negative electrode plate and the positive electrode plate; and laminating and winding the negative electrode plate and the positive electrode plate to form the winding structure.

14. A manufacturing device for the electrode assembly according to claim 1, comprising:

a providing apparatus, configured to provide the positive electrode plate and the negative electrode plate; and an assembling apparatus, configured to laminate and wind the negative electrode plate and the positive electrode plate to form the winding structure.

15. The electrode assembly according to claim 1, wherein:
the negative electrode main body portion and the negative electrode edge portion contain different active materials; and/or
the positive electrode main body portion and the positive electrode edge portion contain different active materials.

16. The electrode assembly according to claim 15, wherein:
an active material of the negative electrode main body portion is silicon, and an active material of the negative electrode edge portion is graphite; and/or
an active material of the positive electrode main body portion is lithium iron phosphate, and an active material of the positive electrode edge portion is ternary lithium.

17. The electrode assembly according to claim 1, wherein:
the negative electrode main body portion and the negative electrode edge portion are spaced apart from each other in the axial direction; and/or
the positive electrode main body portion and the positive electrode edge portion are spaced apart from each other in the axial direction.

18. The electrode assembly according to claim 1, wherein a total thickness of the first positive electrode coating layer and the second positive electrode coating layer is equal to a thickness of the positive electrode edge portion.

\* \* \* \* \*